W. K. LEWIS AND D. T. BLEVINS.
BEET HARVESTER.
APPLICATION FILED JULY 22, 1918.
1,346,322.
Patented July 13, 1920.
4 SHEETS—SHEET 3.
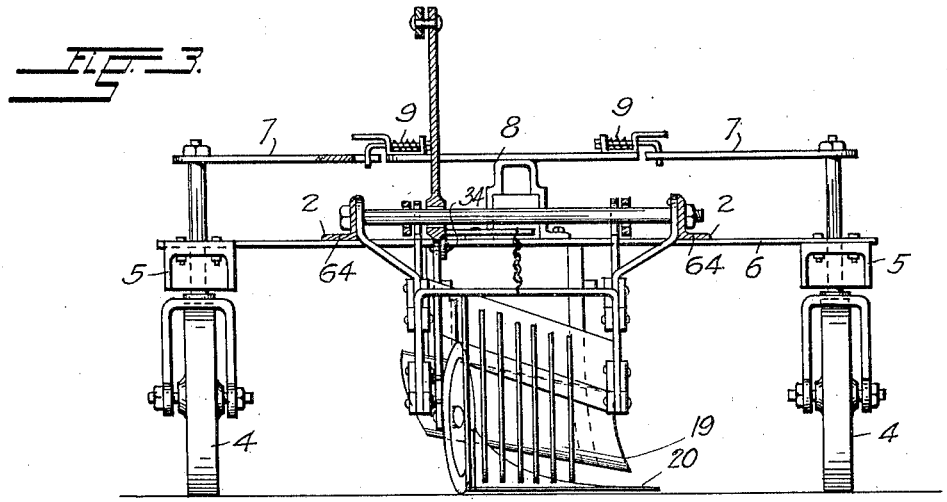
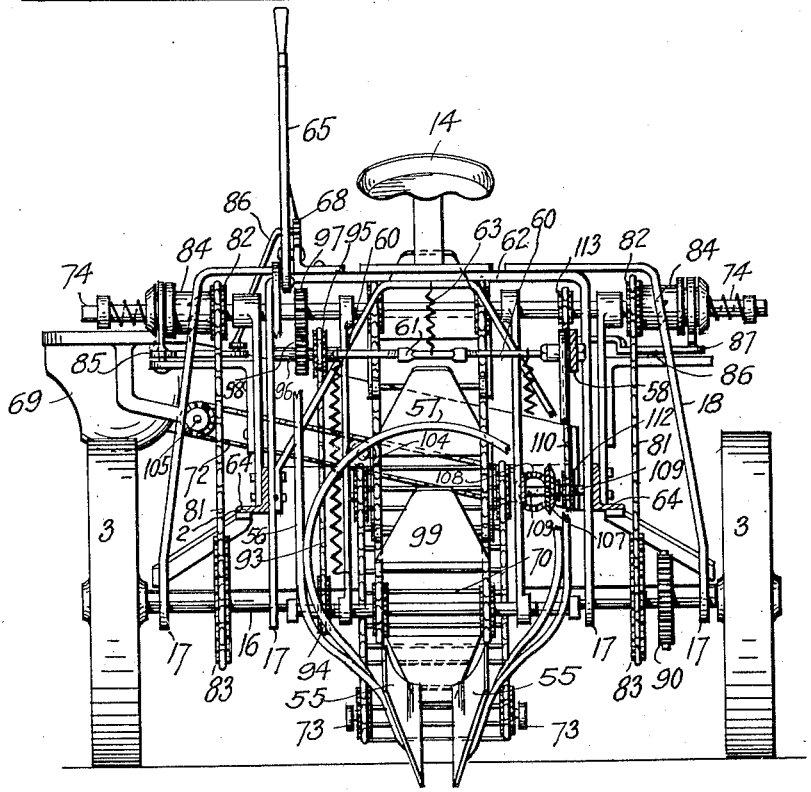
INVENTORS
W. K. LEWIS AND
D. T. BLEVINS,
ATTORNEY W. K. LEWIS AND D. T. BLEVINS.
BEET HARVESTER.
APPLICATION FILED JULY 22, 1918.
1,346,322.
Patented July 13, 1920.
4 SHEETS—SHEET 4.
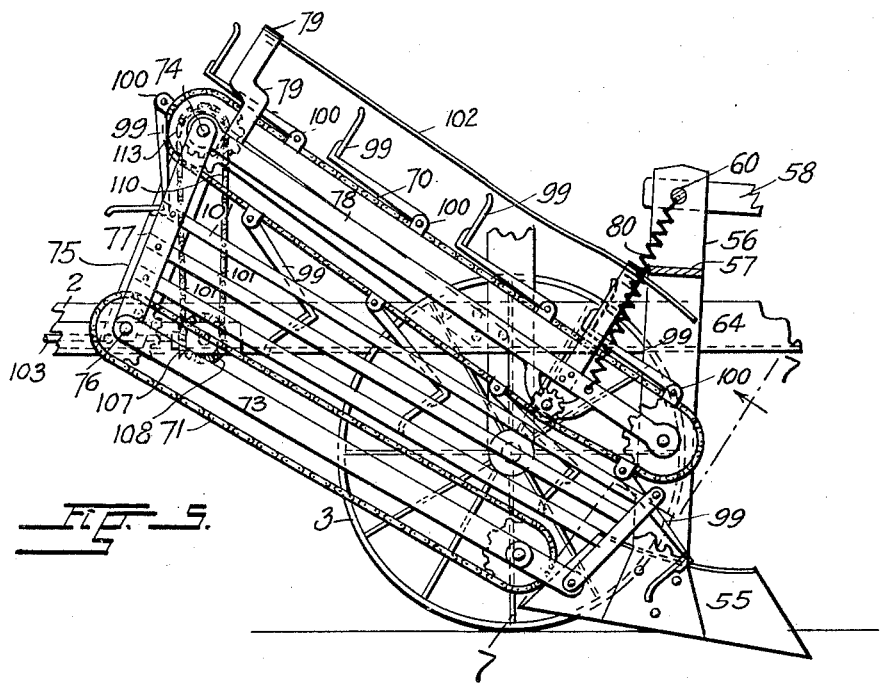
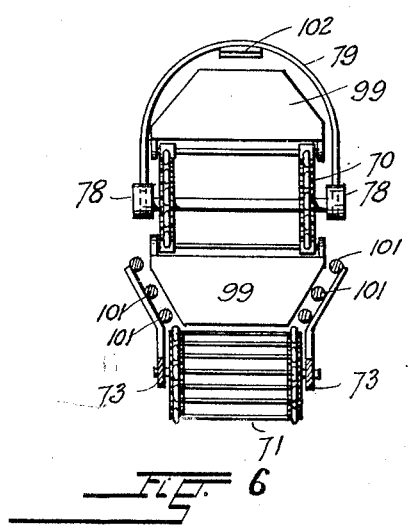
INVENTORS
W. K. LEWIS AND
D. T. BLEVINS.
BY
ATTORNEY.

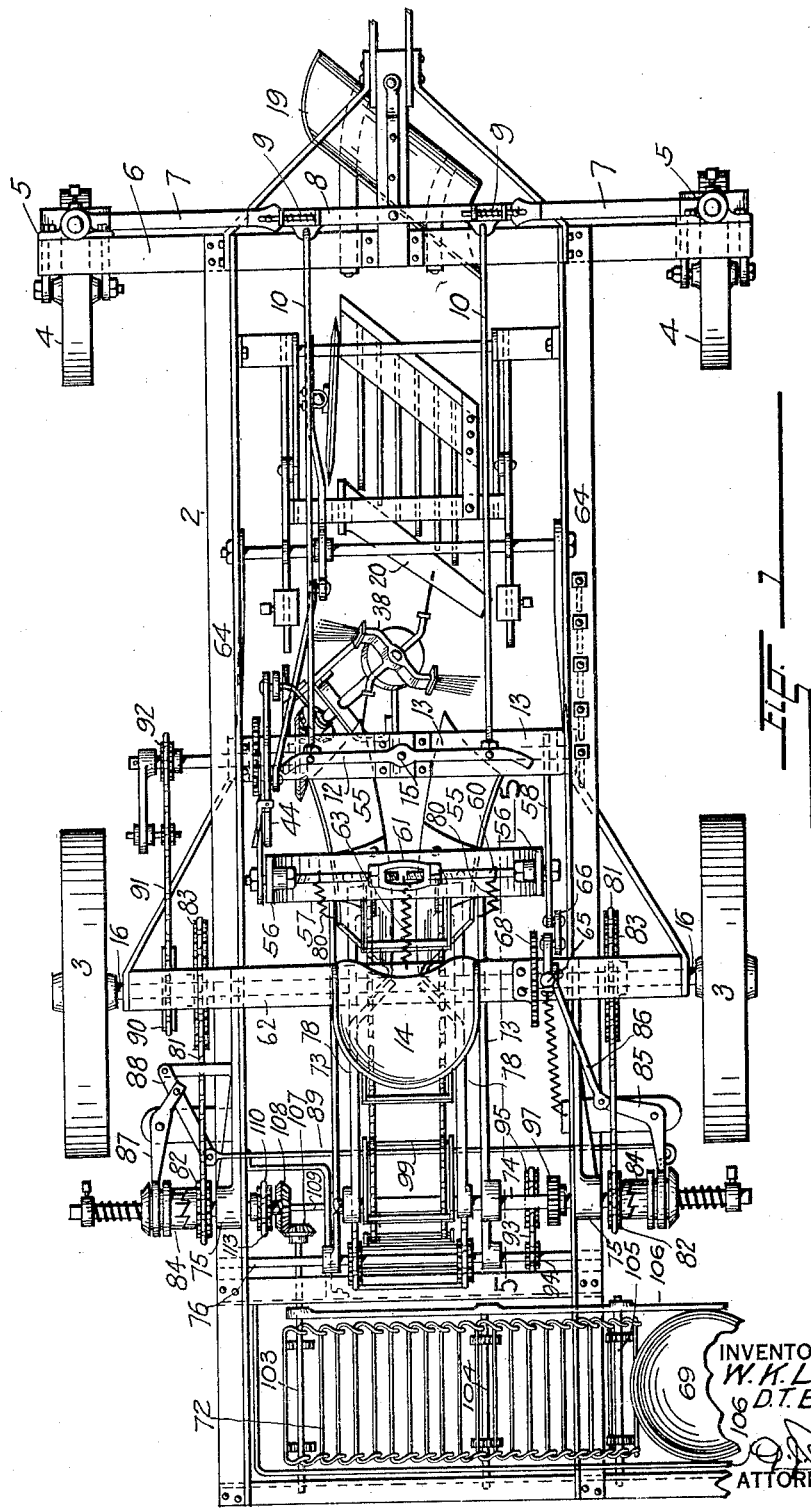

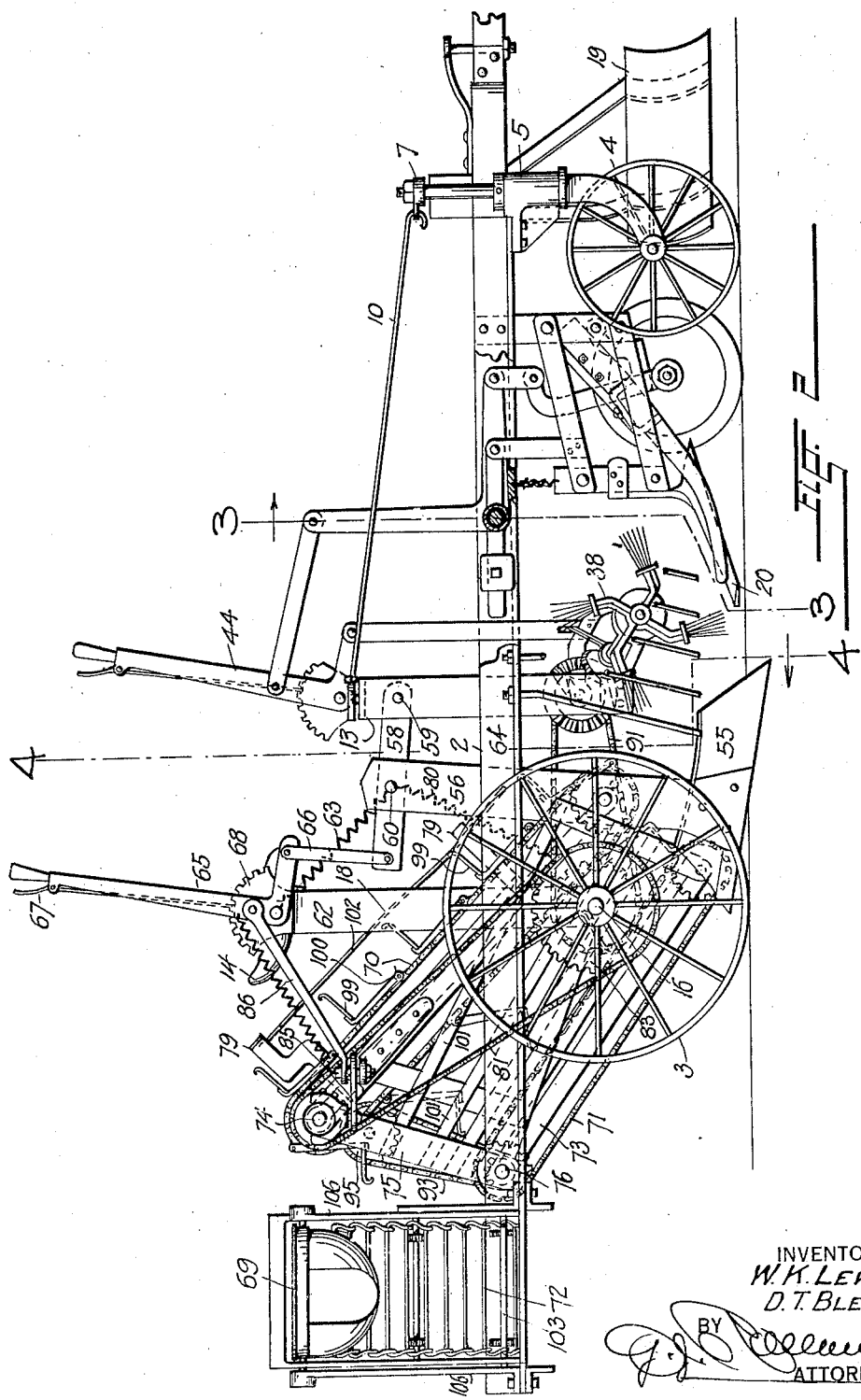

UNITED STATES PATENT OFFICE.

WILLIAM K. LEWIS AND DAVID T. BLEVINS, OF DENVER, COLORADO, ASSIGNOR TO THE NATIONAL BEET HARVESTER COMPANY, A CORPORATION OF COLORADO.

BEET-HARVESTER.

1,346,322.

Specification of Letters Patent.  Patented July 13, 1920.

Application filed July 22, 1918. Serial No. 246,185.

*To all whom it may concern:*

Be it known that we, WILLIAM K. LEWIS and DAVID T. BLEVINS, citizens of the United States, residing at Denver, in the county of Denver and State of Colorado, have invented certain new and useful Improvements in Beet-Harvesters, of which the following is a specification.

This invention relates to beet-harvesting machines and its principal object is to provide in a machine of this character, compact and efficient means by which beets and other root vegetables are lifted from the soil and separately conveyed to a suitable and conveniently placed receptacle.

With the above and other objects in view all of which will fully appear in the course of the following description our invention consists in the construction and combinations of devices shown in their preferred form in the accompanying drawings in which like characters of reference designate corresponding parts, throughout the several views and in which—

Figure 1 represents a plan view of our improved beet-harvesting machine,

Fig. 2, a side elevation of the same,

Fig. 3, a transverse section taken on the line 3—3, Fig. 2.

Fig. 4, a similar section on the line 4—4, Fig. 2,

Fig. 5, a fragmentary section along the line 5—5, Fig. 1, and

Fig. 6, a section taken along the line 7—7, Fig. 5.

Referring to the drawings 2 designates a frame preferably made of structural metal and supported adjacent its rear end upon traction wheels 3 and at its opposite end upon a pair of steering wheels 4 of the caster type which are alined with the others.

The wheels 4 are mounted for pivotal movement about vertical axes in bearings 5 at opposite ends of a cross-beam 6 of the supporting frame, and their spindles are provided with laterally extending arms 7 which are connected for simultaneous movement by a link 8.

The connections between the link and the arms are established through the intermediary of springs 9, and rods 10 connect the link with a foot-lever 12 mounted upon a cross-bar 13 of the frame adjacent the driver's seat 14. The driver of the machine occupying the seat, guides the machine by pressing the ends of the lever which is fulcrumed at 15, with his foot, thereby causing the wheels 4 to move simultaneously about their vertical axes. The traction wheels are mounted upon a shaft 16 which is journaled in bearings 17 on a bridge 18 which is a part of the supporting frame.

In the operation of the machine the shaft drives the different coöperative devices by which the beets are topped, lifted, cleaned and conveyed as will hereinafter be described.

The machine is operated by moving it along the rows of beets in a field to be harvested, by a traction engine or draft animals attached in front thereof.

An obliquely mounted, curved blade 19 at the front end of the machine cuts the foliage off the beet-plants and moves them to one side out of the way of the topping appliance which removes the crowns of the beet-roots projecting above the surface of the ground.

Behind the foliage cutter is a topping appliance designated in its entirety by the numeral 20, and suspended from an adjusting lever 44, and rearward of the topping appliance is a rotating broom 38 which is connected with the same lever.

The topping appliance serves in the operation of the machine to sever the crowns of the beet roots before they are lifted from the ground, and the broom moves the severed beet tops to one side of the machine out of the way of the digging and conveying elements of the apparatus.

The digging element consists of a pair of coöperative laterally converging blades 55 the lower edges of which are spaced from each other and slant downwardly in the direction of the movement of the machine.

The forward edges of the blades slant at an acute angle to the lower edges of the same and are sharpened to cut the soil into which their points project as shown in Fig. 2 of the drawings.

The blades are rigidly secured at the ends of parallel shanks 56 which are connected by an upright arch-shaped yoke 57 and which are suspended from a lever 58 that is fulcrumed on a shaft 59 extending between the upwardly extending portions of the cross bar 13 upon which the operating lever 44 is supported.

The shanks of the digging blades are furthermore connected by a rod 60 the length of which is regulated by a turn-buckle 61 and the entire structure is yieldingly suspended from a bridge 62 on the frame of the machine by means of a coiled spring 63.

The bridge forms a rigid connection between the side-bars 64 of the frame 2 and is extended below the same to provide the bearings 17 for the driving axle of the machine, with which the traction-wheels are rigidly connected.

The bridge also provides a support for the driver's seat 14 and it carries a bell-crank lever 65 which by means of a link 66 is connected with one of the levers 58 from which the digging element is suspended.

The lever has a hand-adjusted pawl 67 which engages the notches of a peripherally toothed segment 68 to hold the parts in their adjusted positions.

The conveying apparatus which transfers the beets lifted from the soil by the action of the digging blades to a chute 69 at the rear end of the machine comprises three endless belt-conveyers 70, 71 and 72 two of which coöperate to move the beets separately to the third which extends transversely with relation to the longitudinal axis of the machine and delivers its load into the chute 69 which discharges either onto the ground or into a wagon or other suitable receptacle placed at the side of the machine.

The two coöperative conveyers 70 and 71 each consist of two parallel chains moving upon sprocket wheels and connected at regular intervals by transverse rods.

The conveyers are mounted slantingly one above the other as best shown in Fig. 5 of the drawings and they move in opposite directions to coöperatively elevate the beets which are lifted from the soil by the action of the digging element.

The two conveyers are separately mounted in frames on which their parallel shafts are rotatably supported. The frame of the lower conveyer consists of two parallel bars 73 the lower ends of which are fastened to the heels of the cutting blades 55.

The upper shaft 74 of the upper conveyer 70 is rotatably mounted on standards 75 erected on the side bars of the frame of the machine, and the corresponding shaft 76 of the lower conveyer which extends through openings at the upper ends of the side bars of its frame, is mounted in bearings on hangers 77 which are suspended from the shaft of the upper conveyer.

The frame in which the last-mentioned conveyer is mounted consists of parallel bars 78 which are connected by arches 79. The upper end of the frame is supported on the upper conveyer shaft 74 and the lower end of the same is suspended from the rod 60 between the shanks 56 of the digging blade 55, by means of coiled springs 80.

The upper conveyer is driven by two sprocket-chains 81 which coöperate with sprocket wheels 82 on its upper shaft and corresponding wheels 83 of larger diameter on the driving axle 16 of the machine. The sprocket wheels 82 are loose on the shaft of the conveyer and sliding spring-urged clutches 84 are provided to establish their rotative continuity with the same.

One of the clutches is attached to a bell-crank lever 85 which by means of a link 86 is connected with the adjusting lever 65 of the digging element, and the other clutch connects with one of two linked levers 87 and 88 which are operatively connected with the bell-crank 85 of the other clutch by a rod 89.

It will be seen that by adjustment of the lever 65 the blades of the digging element may be raised to an inoperative position and the two clutches simultaneously released from the respective sprocket wheels to discontinue the operation of the upper conveyer and at the same time that of the other conveyers which are driven from the driving shaft of the upper conveyer as will hereinafter be explained.

The driving axle of the machine carries in addition to the two sprocket wheels 83, a third sprocket wheel 90 which by means of a chain 91 is connected with a similar wheel 92 of smaller diameter on the counter shaft 41 which drives the rotating broom.

The lower conveyer 71 is driven by a chain 93 which engages a sprocket wheel 94 on its upper and rearmost shaft and a corresponding wheel 95 on a counter-shaft 96 which is mounted on one of the hangers 77 and which by means of two gear-wheels 97 and 98 is operatively connected with the driving shaft of the upper conveyer.

The upper conveyer carries a series of pivoted equidistantly disposed drags 99 each consisting of a transverse blade connected by a pair of parallel arms which at their outer ends are pivoted on lugs 100 on links of the two parallel chains of the conveyer.

A cradle composed of two convergently disposed series of parallel bars 101 is rigidly secured in the space between the two conveyers to receive the blades of the falling drags on the underside of the conveyer on which they are mounted, and guide them in close proximity to the lower conveyer whose upper side moves in the same direction.

A bar 102 which is fastened upon the arches 79 of the frame of the upper conveyer, extends longitudinally above the same to prevent upward displacement of the drags by sudden shocks or other causes.

When in the operation of the machine, the drags turn around the lower shaft of the conveyer with which they are connected they drop into the space between the convergent blades of the digging element before they enter the cradle and by the movement of the conveyer draw the beets which were lifted from the soil by the action of the blades, one by one onto the upper surface of the lower conveyer.

The pivotal movement of the upper conveyer about the axis of its upper shaft and the pivotal connection of the drags permit of a self-adjustment of the parts in accordance with the varying sizes of the beet-roots which in the operation are transferred from the blades of the digging element onto the lower conveyer.

Both large and small roots are thus removed from the digging element and separately delivered onto the transverse conveyer with facility and without danger of injury or displacement.

The transverse conveyer 72 which receives the roots discharged from the conveyer 71 is preferably composed of interconnected bar-links and is supported upon cogged wheels on three parallel shafts 103, 104 and 105 mounted in bearings on cross-bars 106 at the rear end of the frame of the machine.

The conveyer 72 slants upwardly toward the mouth of the before-mentioned chute 69 and its lower shaft carries a beveled pinion 107 which meshes with a correspondingly beveled gear-wheel 108 on a stud-shaft 109 supported on the adjacent side bar of the supporting frame of the machine.

A chain 110 coöperating with sprocket wheels 112 and 113 on the stud shaft 109 and the driving shaft 74 of the upper conveyer provides the medium by which the transverse conveyer is driven in the operation of the machine.

In the operation of our invention the topped beets are lifted vertically from the ground by the movement of the blades of the digging element, passing at opposite sides thereof, and are held in a substantially upright position in the space between the blades until engaged by the drags on the upper conveyer.

The drags on the upper conveyer which overhangs the digging element, move through the space between the cutting blades, from the forward end thereof and convey the lifted beets one by one onto the upper surface of the lower conveyer which discharges them onto the transverse conveyer, and the last-mentioned conveyer delivers its load into the chute through which it passes to fall either onto the ground or in wagons or other receptacles moving or placed at the side of the machine.

The driver of the machine who occupies the seat 14 guides the machine in the desired direction by pressure on the foot-lever which controls the movements of the caster-wheels.

By adjustment of the lever 44 he regulates the position of the topping appliance and the broom with relation to the surface of the ground or places these parts in an inoperative position.

The lever 65 which like the other levers is placed within easy reach of the driver, controls the operative connection of the conveying apparatus with the driving axle of the machine and at the same time regulates the position of the digging element relative to the surface of the ground.

Having thus described our invention what we claim and desire to secure by Letters-Patent is:

1. In a beet harvesting machine, the combination of a digging element for lifting roots from the soil, composed of two laterally converging blades adapted to admit and support the lifted roots between them, an endless conveyer overhanging the digging element, drags having a limited pivotal movement on the conveyer to fall into the space between the blades at the forward end thereof and move rearwardly through the same for the conveyance of the lifted roots, a second conveyer extending rearward of the digging element to provide a support for the beets conveyed by the drags, and a cradle consisting of conveying members at opposite sides of the second conveyer, which support the drags on the lower stretch of the upper conveyer, above the upper stretch of the second conveyer.

2. In a beet harvesting machine, the combination of a digging element for lifting roots from the soil, composed of two laterally converging blades adapted to admit and support the lifted roots between them, an endless conveyer overhanging the digging element, drags having a limited pivotal movement on the conveyer to fall into the space between the blades at the forward end thereof and move rearwardly through the same for the conveyance of the lifted roots, the drags being formed to loosely fit within the space between the blades of the digging element, and a second conveyer extending rearward of the element beneath the line of movement of the drags on the lower stretch of the upper conveyer, to provide a moving support for roots conveyed by the drags.

In testimony whereof we have affixed our signatures.

WILLIAM K. LEWIS.
DAVID T. BLEVINS.